United States Patent [19]
Delamater

[11] Patent Number: 5,828,341
[45] Date of Patent: Oct. 27, 1998

[54] LAPTOP COMPUTER HAVING INTERNAL RADIO WITH INTERCHANGEABLE ANTENNA FEATURES

[75] Inventor: Jeff Delamater, Spokane, Wash.

[73] Assignee: Itronix Corporation, Spokane, Wash.

[21] Appl. No.: 623,945

[22] Filed: Mar. 29, 1996

[51] Int. Cl.[6] .............................. H01Q 1/24; H01Q 1/50
[52] U.S. Cl. ........................ 343/702; 343/906; 455/89; 455/90
[58] Field of Search ................... 343/702, 715, 343/872, 900, 901, 906; 455/89, 90, 351

[56] References Cited

U.S. PATENT DOCUMENTS

| | | | |
|---|---|---|---|
| 5,099,251 | 3/1992 | Fisher | 343/715 |
| 5,218,370 | 6/1993 | Blaese | 343/906 |
| 5,535,435 | 7/1996 | Balzano et al. | 343/702 |
| 5,576,720 | 11/1996 | Gorenz, Jr. et al. | 343/702 |
| 5,579,023 | 11/1996 | Blaese | 343/906 |
| 5,613,224 | 3/1997 | Auvray | 455/89 |
| 5,617,106 | 4/1997 | Tahmassebpur | 343/702 |
| 5,644,320 | 7/1997 | Rossi | 343/702 |
| 5,646,635 | 7/1997 | Cockson et al. | 343/702 |

FOREIGN PATENT DOCUMENTS

| | | | |
|---|---|---|---|
| 60-55704 | 4/1985 | Japan | 343/702 |

OTHER PUBLICATIONS

Leland H. Hemming et al., Chap. 38 "Compatibility", *The Electrical Engineering Handbook* (copyright 1993), pp. 903–948.

*Primary Examiner*—Hoanganh T. Le
*Assistant Examiner*—Tan Ho
*Attorney, Agent, or Firm*—Wells, St. John, Roberts, Gregory & Matkin, P.S.

[57] ABSTRACT

A portable computing device has a computer programmed to store and communicate information and a housing configured to house the computer. A communications device, provided in the housing, is controlled by the computer and configured to communicate information between the computing device and a remote computer. An antenna is carried by the housing and is configurable to electrically couple with the communications device for communicating radio frequency information with the remote computer. A signal coupling device is carried by the housing and is configured to removably mate in signal transmitting relation with an external antenna via a complementary mating signal coupling device. A switch provided with the device is constructed and arranged to selectively connect the communications device with one of the dedicated antenna and the external antenna.

19 Claims, 8 Drawing Sheets

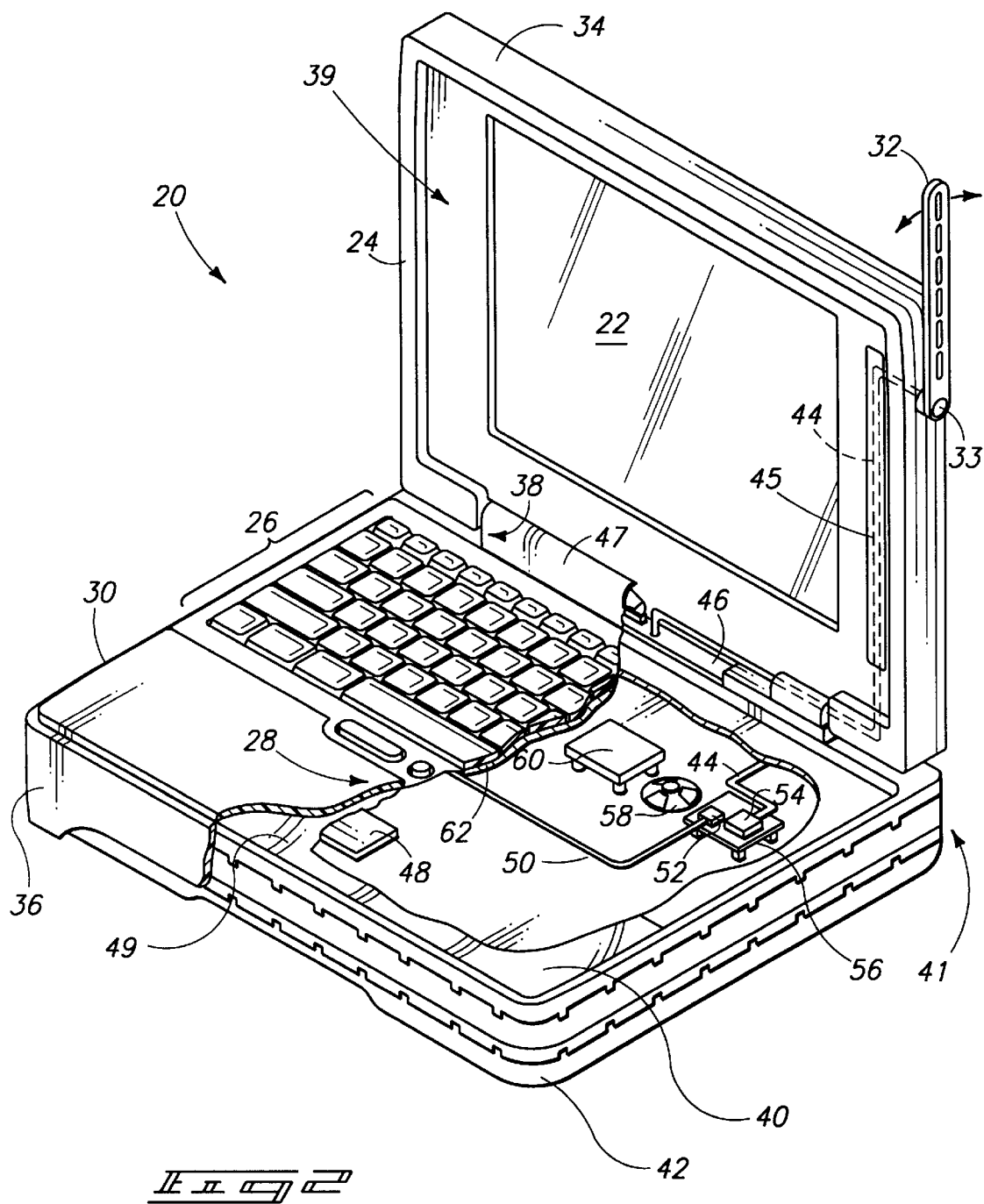

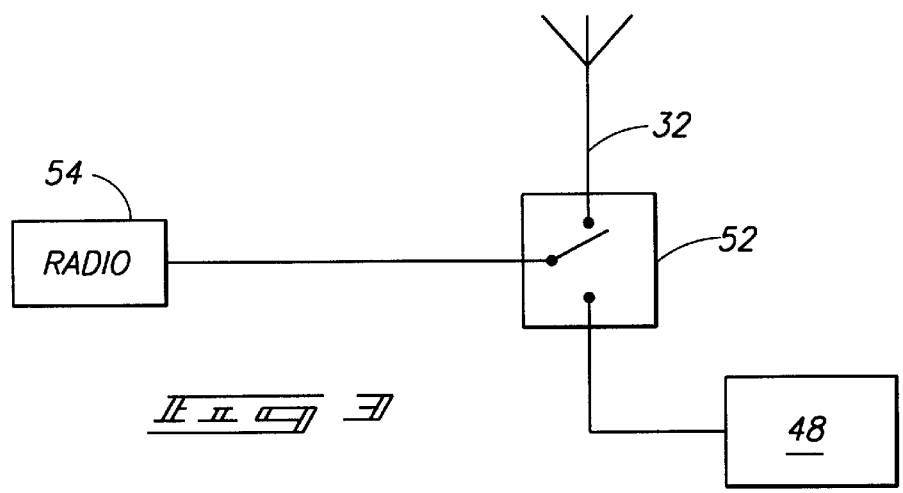
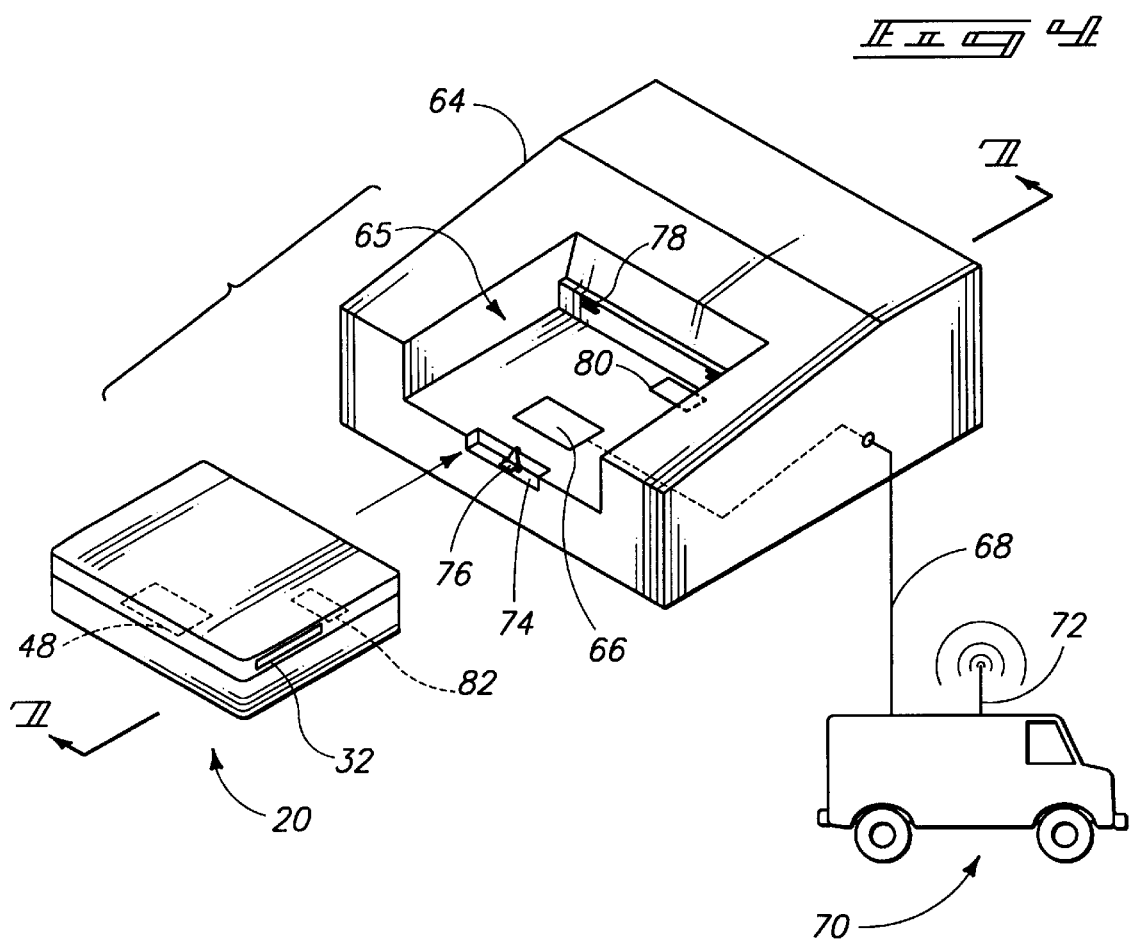

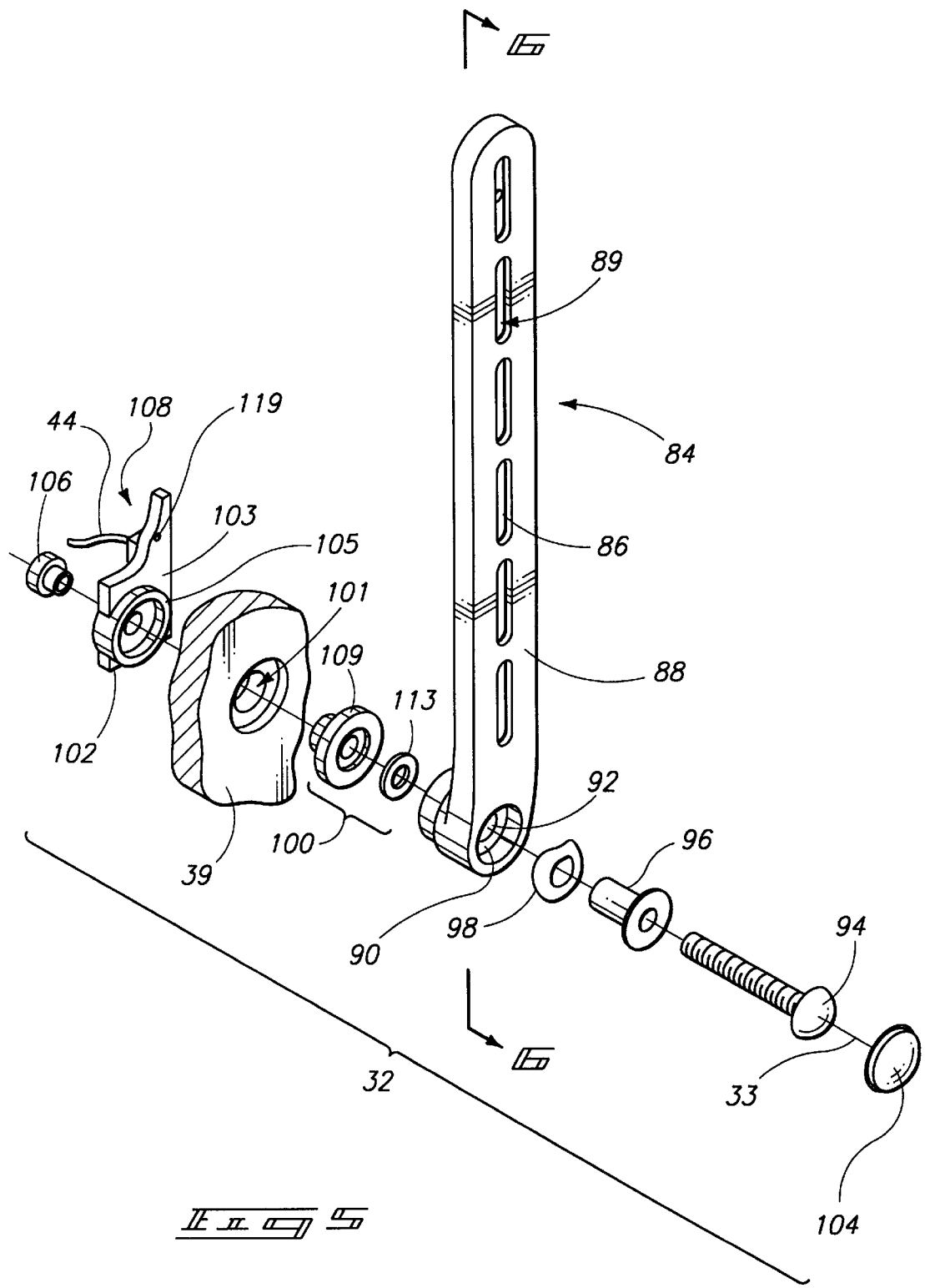

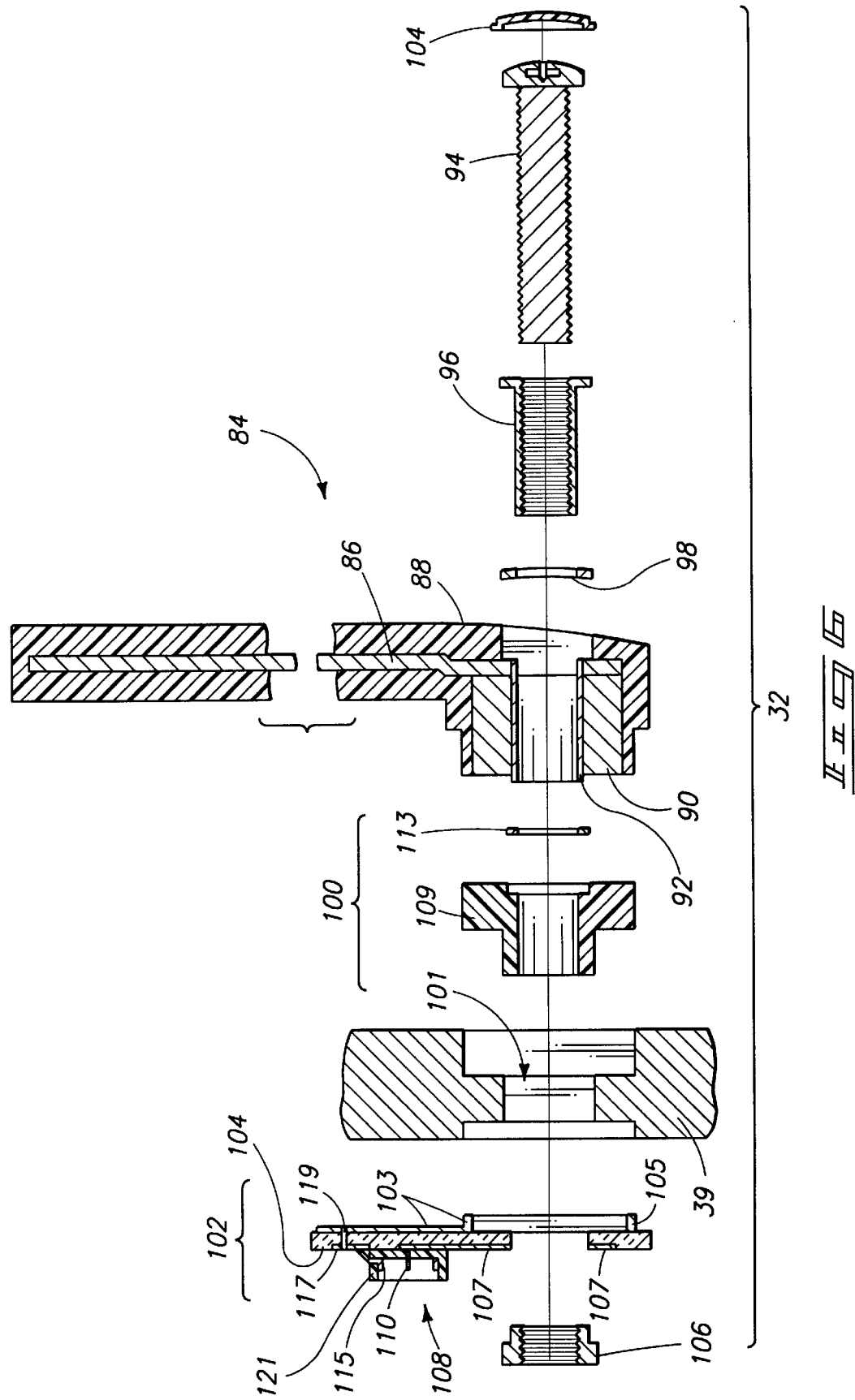

LAPTOP COMPUTER HAVING INTERNAL RADIO WITH INTERCHANGEABLE ANTENNA FEATURES

TECHNICAL FIELD

This invention relates generally to portable electronics equipment, and more particularly to a portable computing device having an internal radio with interchangeable antenna features.

BACKGROUND OF THE INVENTION

Portable electronic devices, such as notebook computers, dataform readers, barcode readers, portable data terminals, work slates, pen computers, and touch screen displays typically require the ability to communicate data with an external device. Due to the portability of these devices, they are typically remotely powered by a battery pack, enabling their use without connection to power supply or communication lines. Typically, such devices are equipped with one or more forms of memory and an I/O port (serial communication port), enabling intermittent hook-up to a data communications network for transmitting and receiving information therebetween. Additionally, an AC power supply is frequently provided via a power supply port for intermittently connecting the device to a separate power supply during operation, or for recharging batteries contained therein.

One way of enabling a portable electronic device to communicate with an external device, such as another electronic device, is to connect the two devices together with a signal line. For example, a typical computer is provided with a bus configured for implementing data transfer among the components of a computer system. The bus connects different parts of the computer system, including the microprocessor, disk-drive controller, memory and input/output ports, enabling them to transfer information. Typically, an input/output port enables the coupling together of separate computers via a cable having a plurality of signal lines. However, for cases where computers are frequently moved, it becomes inconvenient to couple and decouple the cable from the input/output ports. Furthermore, for cases that are separated by great distances, the amount of cable needed to connect them together becomes cost prohibitive.

Another technique for coupling together an electronic device such as a computer system involves utilization of modems on each computer. A modem, short for modulator/demodulator, consists of a communications device that enables the computer to transmit information over a standard telephone line. The modem converts the digitally formatted information of a computer into an analog signal that is capable of being carried over a telephone line to another computer. The receiving computer has a modem that transfers the analog signal transmitted over the telephone line back into a digital signal usable by the receiving computer. Typically, the modem modulates a computer's digital signal onto a continuous carrier frequency over the telephone line. When receiving, the modem demodulates the information from the carrier, transferring it into digital form for use by the computer. However, it is sometimes inconvenient to utilize a telephone line for coupling together computer systems. In some cases, a hard wire telephone line is not available to a user for use with the computer. For other cases, the computer or electronic device is required to communicate frequently and intermittently with another computer, which would require frequent coupling and decoupling of a telephone line with a jack on the computer to enable portable movement of the computer and subsequent connection after each cycle of use.

To enable intermittent and portable use, some devices have a display screen configured for performing wireless infrared data transfer with other computers. For example, some pen computers utilized by delivery personnel have wireless infrared communication capabilities for enabling the tracking of packages being shipped. In use, an operator hand carries the pen computer with them while delivering packages inside of buildings. Upon returning to the delivery vehicle, information in the pen computer is downloaded via the wireless infrared features to a home base where it is monitored.

Other portable electronic devices have a dedicated antenna and a radio modem configured to enable communication between the device and an external communication device. For example, portable cellular phones have self contained antennas for enabling communication with other similar devices. Additionally, notebook computers have been configured to couple with a cellular phone via a PCMCIA slot and connector to enable transmission of data via a modem between the notebook computer and an external communication device. However, the use of such devices to transmit and receive data via an antenna is greatly hindered when they are moved inside a vehicle or building. Typically, the steel shell of a vehicle building shields the transmission of radio frequency (RF) signals. Hence, utilization of such a notebook computer via a cellular phone and PCMCIA slot is greatly hindered when the notebook computer is placed within a service vehicle during operation.

One technique for overcoming shielding problems created when using a portable cellular phone within an enclosure, such as a vehicle, involves hard wiring the cellular phone directly to a dedicated roof-top antenna. Typically, a coaxial cable could be used to couple together the phone and antenna via an antenna feed line. However, an operator must somehow couple and decouple the external antenna with the phone when entering and leaving the vehicle. For delivery personnel, such a coupling configuration can be an annoyance at best.

The present invention relates to an improved portable computing device having an internal radio and portable communications features.

BRIEF DESCRIPTION OF THE DRAWINGS

Preferred embodiments of the invention are described below with reference to the following accompanying drawings.

FIG. 2 is partial breakaway perspective view of the notebook computer depicted in FIG. 1 illustrating the internal radio and antenna features;

FIG. 3 is a schematic block diagram illustrating a radio frequency switch configured to selectively switch between a whip antenna and a capacitive coupling pad connector for connecting with an external antenna;

FIG. 4 is a perspective view of a docking cradle configured for use within a utility vehicle having a roof antenna, the cradle configured to receive the notebook computer of FIGS. 1 and 2;

FIG. 5 is an exploded perspective view of the adjoining antenna assembly pivotally carried by the notebook computer of FIGS. 1 and 2;

FIG. 6 is an exploded vertical center line sectional view of the antenna assembly taken generally along the line 6—6 of FIG. 5;

DETAILED DESCRIPTION OF THE PREFERRED EMBODIMENTS

Figure 1:
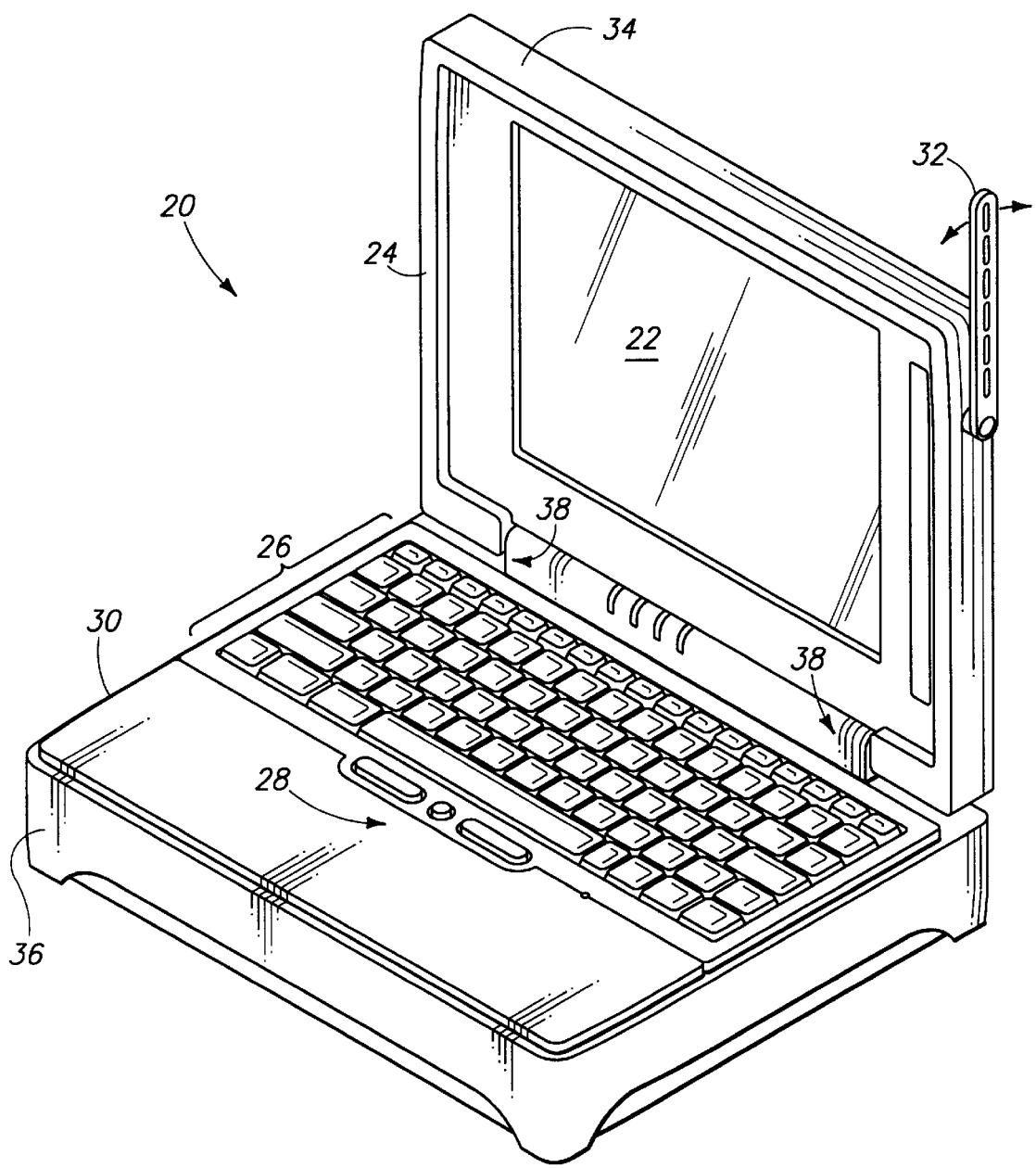
FIG. 1 is a perspective view of a notebook computer having an internal radio and antenna features embodying this invention.

This disclosure of the invention is submitted in furtherance of the constitutional purposes of the U.S. Patent Laws "to promote the progress of science and useful arts" (Article 1, Section 8).

According to one aspect, this invention comprises a portable computing device having a computer programmed to store and communicate information and a housing configured to house the computer. A communications device, provided in the housing, is signal coupled with the computer and configured to communicate information between the computing device and a remote computer. An antenna is carried by the housing and is configurable to electrically couple with the communications device for communicating radio frequency information with the remote computer. A signal coupling device is carried by the housing and is configured to removably mate in signal transmitting relation with an external antenna via a complementary mating signal coupling device. A switch provided with the device is constructed and arranged to selectively connect the communications device with one of the dedicated antenna and the external antenna.

According to another aspect, this invention comprises an antenna for use with a portable computing device having a housing formed at least in part from conductive material with a mounting aperture for receiving the antenna in assembly. The antenna has an antenna arm with a conductive mating abutment portion provided at a pivot end for pivotally connecting the antenna to the housing. The antenna has a fastener formed from conductive material. The antenna has a bushing formed at least in part from dielectric material and configured to be received in assembly along the mounting aperture of the computing device between the antenna arm and the housing. The bushing has a bore sized to receive the fastener there through in assembly so as to be received through the mounting aperture in relative insulated relation with the conductive material of the housing. The fastener is configured to retain together the antenna arm, bushing, and housing so as to form a pivotal mechanical monopole conductive connection between the antenna member and the conductive fastener extending from within the housing. The conductive material of the housing provides a second conductive connection, or ground plane, for a radio frequency feedline.

According to yet another aspect, this invention comprises a signal coupling device for use with a portable computing device. The signal coupling device has a first capacitive connector pad with a nonconducting dielectric support member and at least one metallic patch carried by the member. The device also has a second capacitive connector pad with a nonconducting dielectric support member and at least one metallic patch carried by the member. The first and second connector pads in assembly are presented in proximate adjoining relation and are separated by nonconducting dielectric material so as to form a pair of electromagnetically coupling capacitors, each presented in series in a radio frequency (RF) feedline.

These and other aspects of the invention are described in more detail with reference to FIGS. 1–11. The present invention provides a portable computing device having an internal radio modem with interchangeable antenna features.

Referring in more detail to the drawings, FIG. 1 illustrates a portable personal computer, namely a notebook computer 10 having improved portable data communications features. The computer has a thin panel display 22 housed within an upper case 24. A keyboard 26 and a mouse input device 28 are provided in a top face of a lower case 30. Upper case 24 is supported in pivotal relation with lower case 30 such that a user can move display 22 and case 24 from a closed, or stowed position to a vertically pivoted in-use position. FIGS. 1 and 2 depict computer 20 in an open, or in-use configuration. A whip antenna 32 is pivotally carried on an outer edge of upper case 24, enabling vertical orientation of the antenna regardless of orientation of upper case 24 by way of a pivot connection 33.

For example, antenna 32 can be folded down to stow it when not in use. Likewise, computer 10 can be connected to external peripheral input/output (I/O) devices, such as a desk top display and keyboard. During such operation, computer 20 can be operated with upper case 24 remaining closed. However, antenna 32 can still be pivoted to a vertical configuration with the construction of this invention. Therefore, antenna 32 can be adjusted to a preferred vertical orientation, irrespective of the attitude of upper case 24. Antenna 32 can be operated in transmit and/or receive modes.

Upper case 24 and lower case 30 are covered with impact attenuating coverings 34 and 36, respectively, which protect the rigid load-bearing structural components of each case. The load-bearing structural components of each case are formed by mating together a pair of magnesium shells. Each shell forms a metal case of conductive material. Details of such an impact attenuating covering are similar to those disclosed in our U.S. patent application Ser. No. 08/499,488 filed on Jul. 7, 1995 and entitled, "Impact-Resistant Notebook Computer Having Hard Drive Mounted on Shock-Isolating Mounting Bridge and Impact Attenuating Covering", listing inventors as William F. Erler, Jonathan L. La Marche, David H. Stockham, and Theodore C. Vollmer. This 08/499,488 application, which is now U.S. Pat. No. 5,706,168 is hereby incorporated by reference.

Shielding features are provided by upper case 24 and lower case 30 by forming the structural components of each case from magnesium components. According to FIG. 1, a pair of metal hinges 38 pivotally affix together in conductive relation a magnesium upper shell assembly 39 and a magnesium lower shell assembly 41. Alternatively, each case can be formed from a conductive material, including any of a number of metals, alloys, or composites, or combinations thereof. Each shell assembly is formed by joining together a pair of clam-shell shaped magnesium castings along a peripheral outer edge. For example, bottom shell assembly 41 is formed by a magnesium top shell 40 and magnesium bottom shell 42 as shown in FIG. 2. Details of such a construction are disclosed in the above-referenced U.S. Pat. No. 5,706,168, already incorporated by reference.

Additionally, the conductive magnesium shell assemblies 39 and 41 provide a common ground for tying together separate circuit ground systems for signal returns, signal shield returns, power system returns, and chassis or case grounds. Typically, the majority of signal returns are tied together at a single ground reference point. According to the device of this invention, shell assembly 39 also serves to provide grounding for antenna 32, enabling the formation of a monopole quarter wave radiating antenna. The ground plane is formed by the magnesium shell, and the monopole antenna is tuned to radiate in the 806–940 MegaHertz range. Alternatively, the antenna can be tuned to radiate within other desired ranges.

FIG. 2 illustrates notebook computer 20 in a partial breakaway perspective view, enabling visualization of internally housed radio and communications features. Antenna 32, carried on the opened upper case 24, is pivoted to a vertically oriented position there along. A coaxial radio frequency (RF) cable 44 connects antenna 32 with communications equipment housed within lower case 30. RF cable 44 leaves upper case 24 through one of hinges 38, and enters lower case 30 through an LED board 46 carried on the lower case, beneath a plastic trim cover 47. A resilient elastomeric trim cover 45 enables assembly and maintenance of antenna 32 and cable 44. A capacitive coupling pad 48 is mounted within the bottom shell of lower case 30. Pad 48 is located beneath a battery tray 49 formed by top shell 40. A coaxial RF feedline cable 50 couples pad 48 via a switch 52 to a radio modem 54.

According to FIG. 3, switch 52 is formed from a solid state relay. According to one construction, switch 52 is provided by a Galium Arsenide (Ga As) MESFET switch in the form of a normal semiconductor device. Alternatively, a simpler silicon MOSFET switch could be utilized. Likewise, any of a number of silicon-based switching arrays could be utilized to realize switch 52. Further alternatively, switch 52 can be formed from a magnetic reed switch configured to detect the coupled presence of computer 20 with cradle 64. Likewise, any of the semiconductor-based monolithic constructions can be switched by detecting the input of computer 20 into cradle 64 via sensing of their mated presence therebetween. One technique for detecting coupling of notebook 20 with cradle 64 involves the detection of input power being received by computer 20 via a power connection provided therebetween (as will be discussed subsequently). Various other detection devices can be used, such as a Hall effect switch, etc. However, for purposed of this application, the detection of external power via connectors 80 and 82 provides a suitable default selection of an internal antenna 72 on a vehicle 70 when docking computer 20 within cradle 64.

Radio modem 54 includes a radio, a receiver, and modulation and demodulation circuitry that connect via RF cable 44 with antenna 32. Radio modem 54 is configurable to selectively transmit and receive radio signal-based information between computer 20 and another device, such as a similarly configured computer. Radio modem 54 is mounted on a daughter board 56 via bosses to the bottom of lower case 30. Additionally, a speaker 58 is mounted to the bottom of case 30, adjacent to the radio modem 54. Furthermore, a mobile telephone 60 is also mounted to the bottom of case 30, adjacent to speaker 58. A mother board 62, suspended from the top of lower case 30, supports a microprocessor, memory modules, a telephone modem, and a hard drive (not shown). The microprocessor and memory together form basic components of the computer. Telephone modem 62 is provided to enable direct telephone line connection with computer 20 via a receiving jack provided in the back of the computer, adjacent a serial communication port (not shown).

FIG. 4 illustrates notebook computer 20 as it is being removably mated with a docking cradle 64 by inserting it into a mating portion, or well 65 within the cradle. A capacitive coupling pad 66 is provided within the well 65 for alignment with the complementary corresponding capacitive coupling pad 48 of computer 20. Pad 66 on cradle 64 is connected by way of a coaxial cable, or radio frequency feed line 68 to high gain antenna 72 mounted on the roof of a service vehicle 70. Antenna 72 can be operated in transmit and/or receive modes. Cradle 64 is secured within vehicle 70 to facilitate use of notebook computer 20 therein by a service person operating the computer from within the vehicle. Antenna 72 is required when using computer 20 to transmit/receive information from within the vehicle due to the steel shell of the vehicle causing shielding of radio frequency (RF) signals. Similarly, the cradle and antenna can be constructed to allow operation within buildings, or any partially or fully shielded environment.

During use in cradle 64, computer 20 of FIG. 4 is positively retained therein to ensure connection between connectors formed therebetween. A finger well 74 is formed on a bottom lip edge of well 65 to facilitate loading and unloading of computer 20 from cradle 64. A releasable retaining clip 76 is pivotally carried within well 74 for securing and releasing computer 20 from the cradle 64. To load computer 20 into cradle 64, a rear most edge of computer 20 is inserted into well 65 where a pair of retaining clips 78 engage with a top most lip edge of a covering on the lower case of computer 20. With the rear most edge of computer 20 seated by clips 78, the front most edge of computer 20 is lowered, engaging retaining clip 76 along a lip formed by computer 20. Optionally, retaining clips 78 can be provided on the front edge of well 65 and releasable clip 76 can be provided along the rear edge of well 65.

Preferably, retaining clip 76 has a torsional biasing spring (not shown) configured to positively engaging the clip with a mating flange underneath computer 20. In one version, a small bracket is affixed to the bottom of computer 20 such that clip 76 positively engages the bracket, entrapping computer 20 within cradle 64. In another version, an integrally formed feature within the bottom of computer 20 forms such a flange for engaging with clip 76. To remove computer 20 from cradle 64, an operator need only rotate clip 76 by finger action working against the biasing spring of the clip therein so as to free the front edge of computer 20, enabling slide out and removal of the computer from beneath end clips 78.

According to FIG. 4, notebook computer 20, when loaded in cradle 64, automatically aligns capacitive coupling pad 48 on the computer with an associated capacitive coupling pad 66 on the cradle. Such pads couple together to form capacitors therebetween, providing for electrical interconnection between radio 54 of FIG. 3 and antenna 72 on service vehicle 70. Pads 48 and 66, when positioned in adjoining relation, form the metal plates and interposed dielectric material of a pair of side-by-side capacitors.

Furthermore, a coupling connector 80 shown in FIG. 4 is also provided on cradle 64 for mating with a complementary mating coupling connector 82 on the bottom face of computer 20. Connectors 80 and 82 engage, similarly to pads 48 and 66, while computer 20 is nested in cradle 64 to facilitate power supply to computer 20 from vehicle 70. Additionally, a high speed serial communications coupling is formed by connectors 80 and 82, enabling communication between computer 20 and other computer peripheral devices that are coupled with cradle 64. For example, cradle 64 can be provided with a hard wire coupling to a separate dedicated display screen, a hard drive, a CD-ROM, or any of a number of other computer peripheral devices. Alternatively, coupling pads 48, 66 and connectors 80, 82 can be formed from connectors that physically mate-together in conductive relation, such as coaxial connectors. Further alternatively, coupling connectors 82 and 84 can be formed from one of a variety of high speed serial ports provided by connectors that physically mate-together in conductive relation, or from any of a variety of acoustic or infrared information transmitting devices. Hence, pads 48, 66 and connectors 82, 84 can each be formed from a pair of hard wire connectors that serve to join together via a removable connector the computer with another device, such as an external antenna.

In operation, switch 52 shown in FIGS. 2 and 3 is set to a default connection with antenna 72 (of FIG. 4) when connection with an external power supply to computer 20 is detected by detection circuitry. Alternatively, received signal strength from antenna 32 and antenna 72 (of FIG. 4) can be used to determine which antenna should be configured with the computer. When notebook computer 20 is loaded into cradle 64, antenna 32 (of FIG. 3) will typically be rotated into a retracted or horizontal position, resulting in weaker signals being received along antenna 32.

As shown in FIG. 4, coupling between pads 48 and 66 in an alternative implementation will result in antenna 72 receiving relatively strong signals, causing switch 52 (of FIG. 3) to toggle (or switch) into electrical connection with pad 48 and antenna 72 (FIG. 4). Switch 52 of FIG. 3 is a radio frequency (RF) switch, wherein a detected supply of external power via connectors 80 and 82 to computer 20 triggers switching of the switch to antenna 72. Such forms a diversity switch based on detection of a 12 volt DC external power supply. For the case of transmitting modes, switch 52 is set to a default position by computer 20 to connect one of the antennas. Typically, the default condition would switch radio modem connection with antenna 32. Alternatively, the default condition could be set for switched radio modem connection with antenna 72 (of FIG. 4) for cases where an operator is most likely to use computer 20 to transmit data primarily when the computer is housed within cradle 64 of vehicle 70. Detection of the presence of an external power supply will create a signal that triggers switching of switch 52 to antenna 72. Alternatively, a pure diversity switch that directly monitors signal strength and switches to the antenna with the strongest signal could be used. Further alternatively, a diversity circuit could be utilized in place of diversity switch 52 of FIG. 3, enabling software implementations to impart smart, or intelligent switching logic to better implement antenna selection between transmit and receive modes.

Alternatively, capacitive coupling pads 48 and 66 of FIG. 4 can be replaced with spring-loaded dual pin mechanical connectors. For example, a spring biased pin connector similar to that used with connectors 80 and 82 (of FIG. 4) can be substituted for pads 48 and 66. One component forms a male connector and the other a female connector. However, with such an alternative construction, the likelihood for dirt and mechanical contact wear increases the likelihood that electrical connection therebetween will degrade over time. Such highlights the benefits of utilizing capacitive coupling between pads 48 and 66, as will be discussed in greater detail below with respect to FIGS. 7–11.

As shown in FIG. 5, whip antenna 32 is pivotally mounted to the magnesium top shell assembly 39 of the laptop computer. Construction details of antenna 32 are depicted in exploded perspective view in FIG. 5. Antenna 32 is formed from an elongate antenna arm 84 that is carried by a pivot connection defined by axis 33. Arm 84 has a steel antenna member 86 that is in-molded within an elastomeric covering 88 having a plurality of spaced apart apertures there along. Covering 88 is formed from a resilient elastomeric impact resistant material similar to that utilized when forming the upper and lower coverings 34 and 36 (of FIG. 1). One such suitable material is Sorbothane™ which is a registered trademark of Sorbothane, Inc. Another suitable material is any of a number of elastomeric natural or synthetic polymers, such as naturally occurring or synthetically derived rubber. Alternatively, various other forms of energy absorbing or energy dissipating plastic or foam materials can be utilized to form covering 88 (as well as coverings 34 and 36).

As shown in FIG. 5, covering 88 is necessarily provided on antenna member 86 in order to protect the antenna member from impact damage. For example, an impact can occur to the exterior of the computer, either by dropping the computer, or striking the computer with another object. Furthermore, a small centering hole is provided in an upper portion of steel member 86 to facilitate centering of member 86 within a mold during in-molding of covering 88 there about. Additionally, a bottom portion of steel member 86 contains an aperture which further facilitates centering of the steel member within a mold during in-molding of the covering 88. Furthermore, an array of aligned elongate apertures 89 are formed in covering, exposing antenna member 86 there along.

As shown in cross-section in FIG. 6, antenna arm 84 includes a brass nut 90 and a brass thin-walled tube 92 at it's bottom most end to facilitate rotatable mounting of arm 84 to shell assembly 39 on the computer. Alternatively, nut 90 and tube 92 can be formed from a single piece of machined brass. Steel antenna member 86 has an aperture sized to align with a similar aperture on brass nut 90, after which thin wall tube 92 is inserted through nut 90 and the aperture of member 86, joining them snugly together there along. Subsequently, each end of tube 92 is nominally swaged or cold head formed, entrapping nut 90 to member 86 in rigid and electrically conductive relation there along. The assembled-together configuration of member 86, nut 90 and tube 92 are then in-molded within covering 88 during its formation thereabout.

According to FIGS. 5 and 6, a threaded steel fastener 94 is received through a shouldered brass bushing 96 and a steel spring washer 98 before being inserted within a bottom opening of arm 88. In this manner, fastener 94, bushing 96, and spring 98 are mated in electrically conductive contact with tube 92 and steel antenna member 86. The reduced diameter body of bushing 96 is received through the opening in spring washer 98, enabling bushing 96 to form a bearing surface with the inner diameter of thin walled tube 92. Hence, arm 84 rotates about bushing 96, while spring 98 ensures seated electrical connection between fastener 94 and bushing 96, as well as antenna member 86. Fastener 94, after passing through arm 84, then passes into a dielectric bushing 100 that is received within a complementary aperture 101 within the magnesium top shell assembly 39 of the laptop computer. In this manner, fastener 94 passes through assembly 39 by way of a dielectric (non conductive) bushing body 109 of bushing 100 where it mounts with a 50 Ohm impedance matching network connector board 102. By properly matching impedance of the antenna with the connector board (by providing a complex conjugate impedance), the circuit can be tuned in order to realize enhanced power throughput and reception there along.

Bushing 100, as shown in FIG. 6, is formed from a dielectric bushing body 109 and a steel washer 113. Washer 113 is seated within a circumferential pocket formed at an expanded shoulder end of the bushing body 109, about a central through hole or port. In assembly, bushing 100 seats within an antenna receiving port 101 formed through conductive shell assembly 39. Washer 113 forms a pressure contact surface against which tube 92 of antenna arm 84 engages in assembly. Hence, tube 92 engages in sliding contact with washer 113 during pivotal positioning of antenna arm 84 by an operator. Similarly, nut 90 rotates relative to bushing body 109. Hence, fastener 94, bushing 96, washer 113 and bushing body 109 mount immovably to assembly 39. Additionally, body 109 of bushing 100 insulates magnesium shell assembly 39 from conductive contact with steel antenna member 86. Hence, bushing 100 serves a dual purpose: First, bushing 100 acts as an insulating layer between the case and the conductive steel antenna member 86; Secondly, bushing 100 forms a wear-resistant rotating contact surface.

As shown in FIG. 6, connector board 102 mates in engagement with a back face of magnesium assembly 39, trapping assembly 39 between bushing 100 and the connector board 102. A metallized face 103 is provided on connector board 102 such that face 103 engages in electrically conductive relation with the magnesium top shell assembly 39 of the laptop computer. Connector board 102 is made substantially from a fiber glass FR4 board 104 to which metallized face 103 is applied there along. A metallized shoulder 105 is also formed along the contacting face of board 102 for engaging with magnesium assembly 39. A threaded insert, or PEM nut 106 retains the entire assembly 32 together via fastener 94, which rigidly secures connector board 102 in electrically conductive relation via metallized face 103 and metallized shoulder 105 with the magnesium top shell assembly 39. A conductive trace 107 is formed on connector board 102 on an opposite side from metallized face 103, between a coaxial connector 108 and an opening extending through shoulder 105. Conductive trace 107 electrically connects the inner circumferential conductor, or wire 110 on a coaxial connector 108 with PEM nut 106 and fastener 94.

In this manner, the steel antenna member 86 is electrically connected in conductive relation with the inner conductor of coaxial connector 108 via PEM nut 106, fastener 94, bushing 96, spring 98, tube 92 and steel antenna member 86. Hence, a single conductive monopole element extends outside of magnesium top shell assembly 39 via dielectric bushing 100 for radiating and receiving RF signals. A single electrical contact results there through that is required to maintain electrical connectivity via a single electrical pivot connection along axis 33. Hence, contact wear and galling problems that jeopardize electrical connectivity of traditional dual conductor pivot connectors are eliminated.

According to FIG. 6, the second electrical connection from coaxial connector 115 is provided by a circumferential outer connector 108. Conductor 115 electrically connects through board 104 of connector board 102 by way of conductive trace 117 and metallized via 119, and into electrically conductive relation with metallized face 103 and shoulder 105. Hence, when assembled via the compressive forces of fastener 94 and nut 106, face 103 and shoulder 105 engage in conductive relation with magnesium top shell assembly 39. As a result, circumferential outer connector 108 grounds with the magnesium housing of the notebook computer. Further details of such construction are also depicted in FIG. 5 there along.

Figure 7:
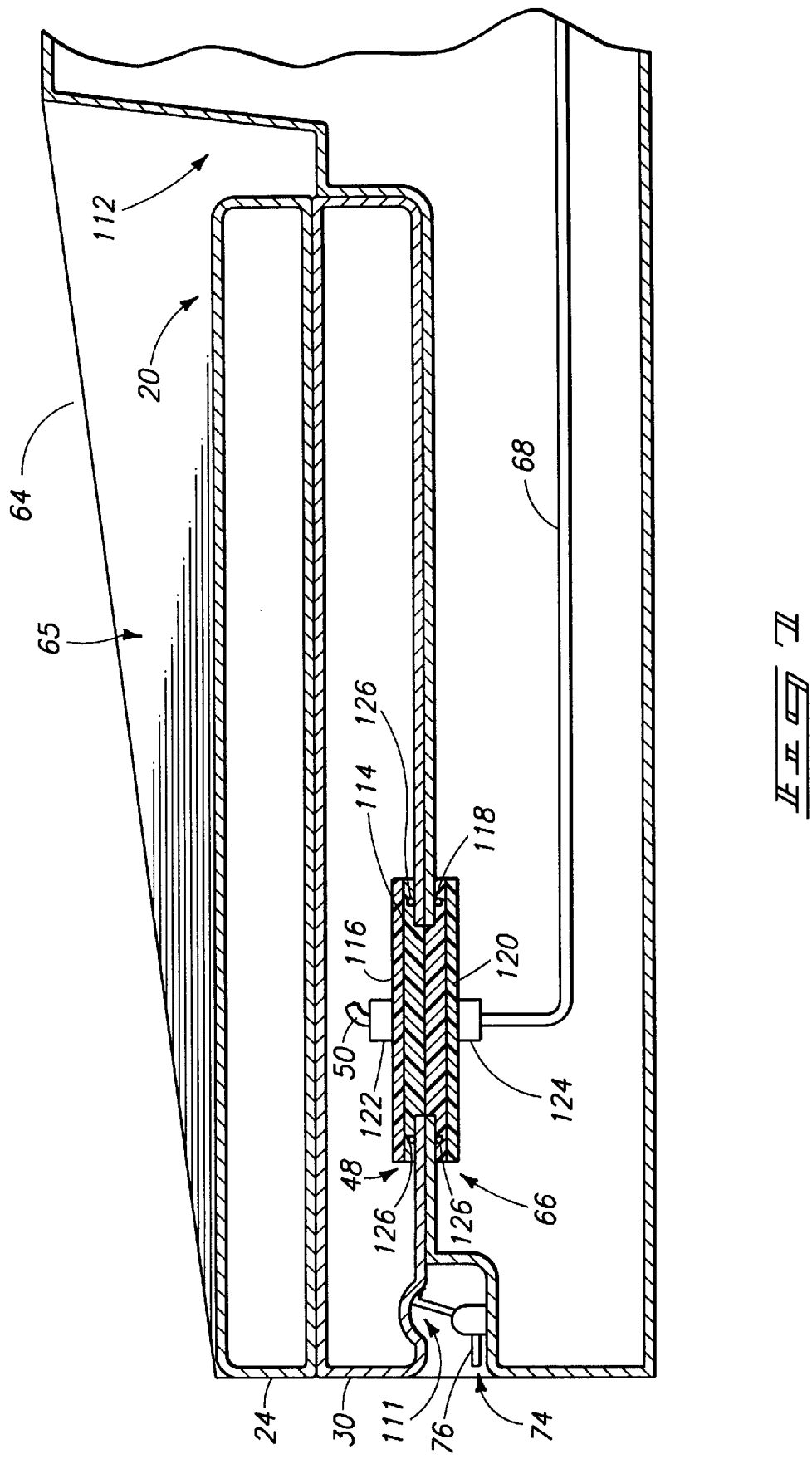
FIG. 7 is a vertical sectional view of the notebook computer and docking cradle with the computer mated with the cradle and taken generally along the line 7—7 of FIG. 4.

FIG. 7 illustrates notebook computer 20 received in mated engagement within well 65 of docking cradle 64. More particularly, in-use configuration of capacitive coupling pads 48 and 66 is made readily apparent. Such a nested configuration is ensured via engagement of retaining clip 76 with a lip edge provided within a finger trench 111 along the underside leading edge of computer 20. Trench 111 facilitates carrying of computer 20 during loading and unloading from cradle 64. Spring loaded action of clip 76 ensures positive retention there along, while finger biasing of clip against the action of such a spring enables release of computer 20 from cradle 64. A recess 112 is provided along a rear-most portion of well 65 to facilitate opening of upper case 24 while computer 20 is docked within cradle 64. Hence, upper case 24 can be raised to an elevated user-viewable configuration while computer 20 is docked within cradle 64. Alternatively, case 24 can be closed while operating from cradle 64, particularly where an external screen and keyboard are coupled via cradle 64 with computer 20.

As shown in FIG. 7, capacitive coupling pad 48 is formed from a two-piece sandwich construction which is flush-mounted within an opening in the bottom of lower case 30. Similarly, capacitive coupling pad 66 is formed from a two-piece sandwich construction that is flush-mounted within well 65 of cradle 64. Pads 48 and 66 are each formed from a plastic support member 114 and 118, respectively, joined with a printed circuit (PC) board 116 and 120, respectively. Plastic member 114 forms a reduced thickness shelf for supporting the pad along an opening along within lower case 30. Members 114 and 118 are formed from polypropylene, a nonconducting dielectric. Alternatively, any of a number of nonconducting dielectric materials can be used for at least one of the pads. PC board 116 is adhesively bonded to the back (or unexposed) face of member 114. A circumferential extending o-ring seal 126 is carried within a receiving groove along the shelf of member 114 for facilitating sealing of pad 48 with lower case 30. Similarly, plastic support member 118 has a reduced thickness shelf formed along an outer periphery for ensuring substantially flush-mounting of pad 66 along the exposed portion of well 65 on cradle 64. PC board 120 is adhesively bonded to the back (or unexposed) side of member 118 to form pad 66. Additionally, an o-ring seal 126 is received in a groove within member 118 for sealing pad 66 with well 65 of cradle 64. PC boards 116 and 120 contain antenna features having capacitive coupling capabilities therebetween for communicating between laptop computer 20 via coaxial cable 50 and an external radio on a vehicle (see FIG. 4) via coaxial cable 68. Coaxial cables 50 and 68 comprise radio frequency (RF) feed lines that form a coupling between an antenna and the radio modem (not shown) contained within computer 20.

Preferably, members 114 and 118 are formed from polypropylene, which is a nonconductive dielectric. Alternatively, members 114 and 118 can be eliminated altogether, and PC boards 116 and 120 can be configured to seal and flush mount with the computer case 30 and well 65 of cradle 64. In such a construction, copper is clad onto the back side of each PC board, and the front side is exposed to weather. Here, the PC board provides a nonconductive dielectric layer between the metallic patches, creating a pair of side-by-side capacitors therebetween. For example, copper can be printed onto a circuit board, then etched to create the geometry of a patch, or conductive plate element. With this construction, it is not necessary to adhesively bond together each PC board and support member therebetween.

Figure 8:
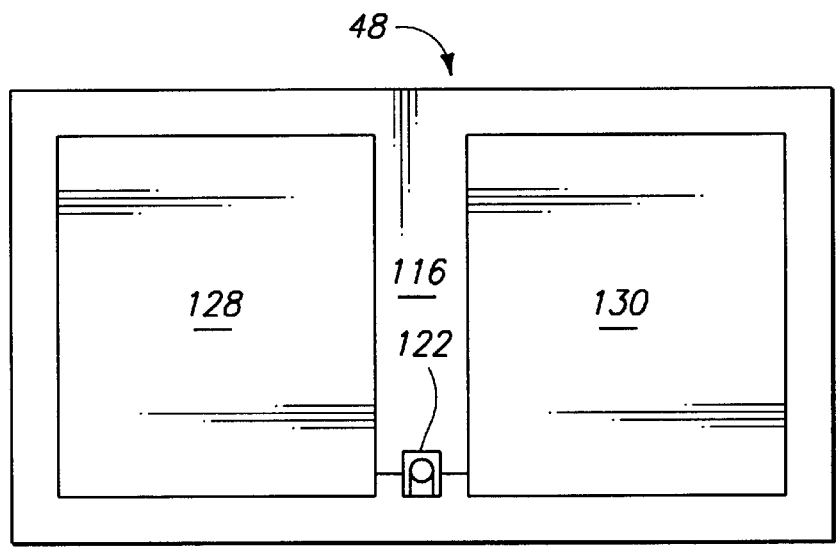
FIG. 8 is a plan view of the top face of the capacitive coupling pad connector of FIGS. 1–3.

FIG. 8 illustrates one embodiment for constructing capacitive coupling pad 48. Pad 66 (of FIG. 7) is similarly constructed. FIG. 8 illustrates layout of capacitive coupling pad 48 in plan view. Pad 48 is depicted with the unexposed (or backside) portion shown upright, generally shown as PC board 116. A pair of conductive copper patches 128 and 130 are printed onto the top of PC board 116, and are connected via a coaxial connector 122 to coaxial cable 50 (see FIG. 4). As shown in FIG. 4, capacitive coupling pad 66 similarly formed by a pair of conductive copper patches 132 and 134 that are electrically connected via a coaxial connector 124 with coaxial cable 68. Alternatively, conductive epoxy can be printed onto a dielectric support member, forming a printed microstrip patch.

Figure 9:
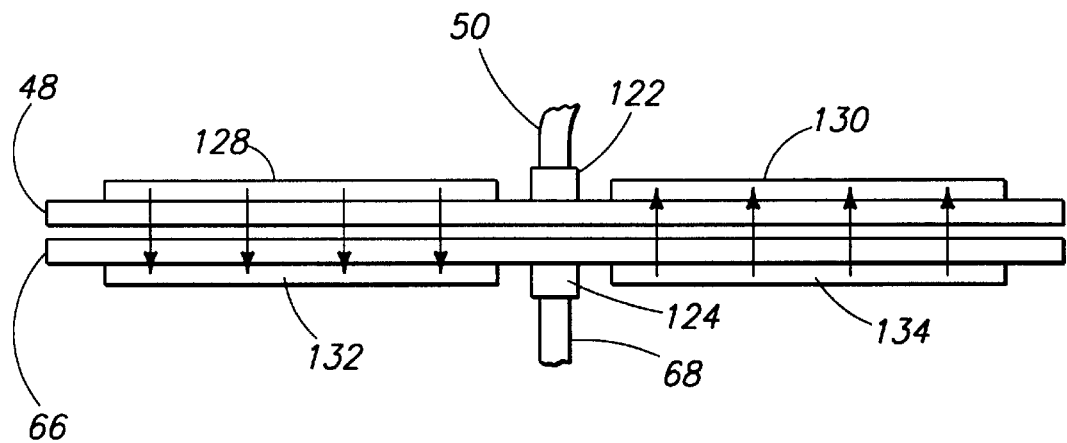
FIG. 9 is an enlarged vertical sectional view of the capacitive coupling pad connector mated in nested communication with a corresponding connector on the docking cradle of FIG. 4.

According to the construction of FIGS. 7 and 8, pads 48 and 66 protect their associated metallic patches 128, 130 and 132, 134, respectively by forming them on the back surface of each pad, away from the contact surfaces formed during use. Furthermore, the PC boards 114 and 120 and the dielectric support members 114 and 118 provide the non-conductive dielectric material between pads 128 and 132, and pads 130 and 134 (as shown in FIG. 9 below). Therefore, a capacitor is formed between each associated pair of pads when computer 20 is mated in engagement with cradle 64. Furthermore, presentation of the dielectric support members 114 and 118 along the adjoining surfaces provides a wear resistant surface that is unlikely to is collect dirt and contaminants, while still maintaining a high quality electromagnetic connection therebetween. Furthermore, the substantially flush arrangement of each pad 48 and 66 with the outer surface of notebook 20 and the well 65 of cradle 64, respectively, further reduces wear and contamination problems along the respective mating surfaces formed therebetween. Hence, a capacitive coupling connection is formed therebetween that is highly resistant to wear during use.

As shown in FIG. 9, an enlarged vertical section view of coupling pad 48 and accompanying coupling pad 66 depicts electromagnetic communication there between via a typical nested arrangement according to that depicted in FIG. 7. When the computer is nested in the cradle, capacitive coupling pads 48 and 66 are brought into close adjoining relation, or even in intimate contact. A layer of nonconductive dielectric is provided between patches on each pad, producing a capacitor. Patches 128–134 behave as tuned circuits since each coaxial connector is formed from a mini 50 Ohm device, and each antenna is formed preferably from a 50 Ohm microstrip, or line. In this manner, the connectors and the capacitor produced by each pair of patches are tuned therebetween. By tuning the resulting capacitors and connectors, the tuned circuit will minimize losses, by enhancing output of RF signals generated between pairs of patches. Alternatively, a conductive epoxy antenna construction can be utilized to form patches 128–134.

Alternatively, a spring pin connector having a dual pin electrical connection can be substituted for pads 48 and 66 (see FIG. 4). However, such a construction is more susceptible of contamination from dirt, grime, and mechanical wear. Furthermore, an inductor can be put in series in order to tune each pad, making a very low impedance interconnect between cradle 64 and computer 20, minimizing losses during transmission and reception within 45 MegaHertz of each other. Hence, a 50–60 Megahertz wide band pass filter can be realized there between.

Pursuant to the constructions of FIGS. 8 and 9, patches 128 and 130, as well as patches 132 and 134 have a generally rectangular, or square, configuration. With such a configuration, it is possible for fringing effects to occur between adjacent patches on the same pad. Hence, patches 128 and 130 should be spaced apart by at least a nominal amount. Alternatively, the construction of FIG. 10 can be utilized in an effort to minimize fringing effects by spacing apart a substantial portion of each patch there along.

Figure 10:
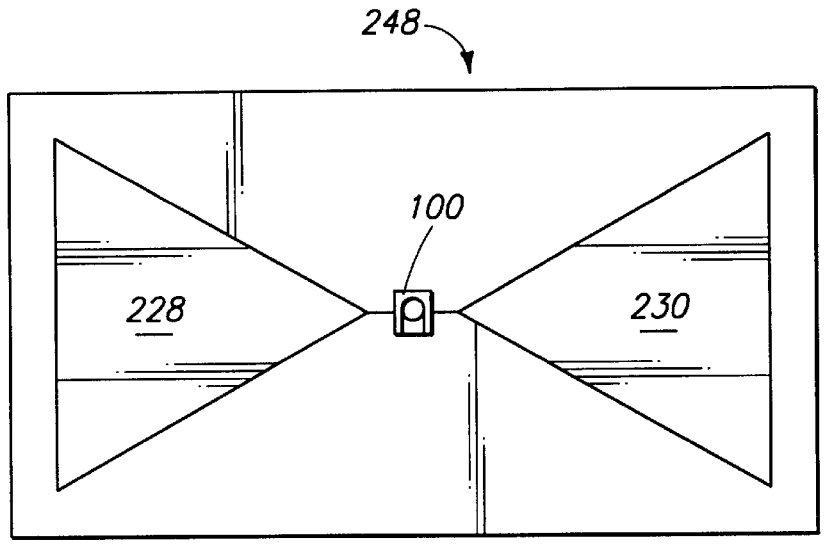
FIG. 10 is a plan view of one alternative layout for the capacitive coupling pad of FIG. 8.

FIG. 10 illustrates an alternative construction for a capacitive coupling pad 248 having triangular shaped patches 228 and 230. Patches 228 and 230 are constructed similar to those of pads 48 and 60. However, the orientation of the patches is such that a minimal amount of fringing effects will be seen as a result of electromagnetic coupling between adjacent patches. Particularly, one corner of each patch is oriented in proximate relation with a corresponding corner of the other patch. The remaining two corners are spaced apart, respectively, decreasing the amount of edge surface on each patch that is placed in close relation with the neighboring patch. Hence, a resulting reduction in fringe effects is readily apparent.

Figure 11:
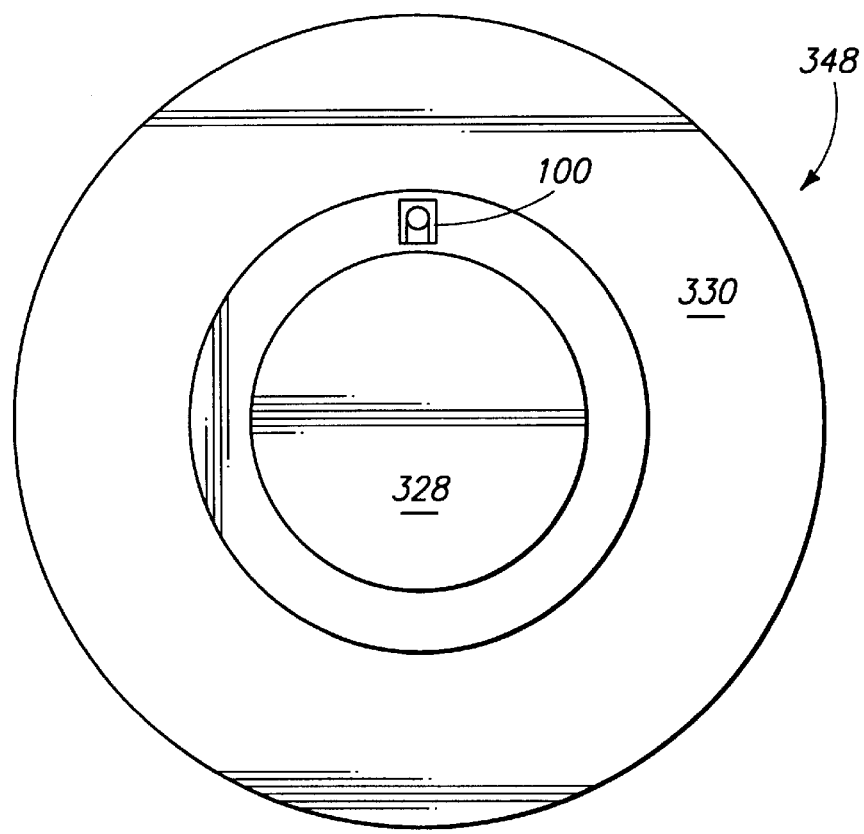
FIG. 11 is a plan view of another alternative layout for the capacitive coupling pad connector of FIG. 8.

FIG. 11 illustrates a second alternative construction for a capacitive coupling pad 348 having an inner circular patch 328 and an outer cylindrical patch 330 disposed coaxially about the inner patch 328. Such a construction presents a suitable patch configuration wherein a pair of devices to be mated is ensured of being axially aligned, but the relative rotational position therebetween can not be ensured.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. An antenna for use with a portable computing device having a housing formed at least in part from conductive material with a mounting aperture for receiving the antenna in assembly, comprising:

an elongate antenna arm having a conductive mating abutment portion provided at a pivot end;

a conductive fastener conductively associated with the antenna arm; and an insulative bushing disposed between the antenna arm and the housing so as to pivotally support the antenna arm along the abutment portion and configured to support the fastener in insulated relation with the housing conductive material;

the fastener configured to retain together the antenna arm, bushing, and housing so as to form a pivotal mechanical monopole conductive connection extending between the antenna arm and the conductive fastener from within the housing, and with the housing conductive material providing a separate conductive ground connection for a radio frequency feedline.

2. The antenna of claim 1 wherein the fastener comprises a threaded bolt, and the antenna further comprises a nut having threads for receiving the bolt in assembly, the nut received along an inner side of the mounting aperture in relative insulated relation, the nut and bolt cooperating together in assembly to mate together the antenna member, the bushing and the housing, with the housing receiving the antenna such that the bushing insulates the antenna arm from the housing conductive material.

3. The antenna of claim 1 further comprising an antenna board received in assembly within the housing and having a proximal face configured to mate in conductive engagement with the housing and a distal face having a conductive trace portion for electrically communicating with the antenna arm, the board configured to receive the fastener in assembly such that the board is engaged by the fastener in assembly so as to retain the conductive material of the housing in conductive engagement with the antenna board proximal face.

4. The antenna of claim 1 wherein the inner face conductive trace portion of the antenna board, the antenna arm, and the fastener have a combined impedance on the order of about 50 Ohms.

5. The antenna of claim 1 wherein the bushing comprises a body of dielectric material having a recess, and a metal washer sized to be received within the recess, the washer presenting a wear resistant surface against which the antenna arm abutment portion mates in pivotal engagement in assembly.

6. The antenna of claim 1 wherein the antenna arm comprises an elongate antenna member formed from a piece of conductive metal.

7. The antenna of claim 6 wherein the antenna arm further comprises an elastomeric covering of impact resistant material provided about the antenna arm.

8. The antenna of claim 7 further comprising a plurality of axially arrayed apertures provided in the covering so as to expose the metal antenna member contained therein.

9. The antenna of claim 7 wherein the metal antenna member is in-place molded within the elastomeric covering.

10. The antenna of claim 1 further comprising a steel spring washer interposed between the fastener and the antenna arm so as to ensure positively seated conductive engagement between the antenna arm and the fastener during pivotal movement of the antenna.

11. An antenna adapted to be carried by a conductive support member of a housing of a portable electronic device, comprising:

an antenna arm having a conductive pivot end configured to pivotally mount the antenna arm to a housing;

a conductive support member having an aperture extending into the housing;

an insulative bushing received into the aperture between the antenna arm pivot end and the conductive support member; and a conductive fastener configured to retain the antenna arm and the bushing with the housing, the conductive fastener electrically communicating with the antenna arm, and the bushing supporting the antenna arm in pivotally insulated relation with the housing conductive support member;

the antenna arm configured to provide a pivotally supported monopole antenna.

12. The antenna of claim 11 wherein the antenna arm pivot end, the conductive abutment end, the bushing and the conductive fastener cooperate in assembly to provide a pivotal connection for mounting the antenna to the housing.

13. The antenna of claim 12 wherein the antenna arm comprises an elongate conductive member rotatably carried in electrically conductive association with the conductive fastener, the conductive fastener supported in assembly in electrically isolated relation with the housing conductive support member by the bushing.

14. The antenna of claim 11 wherein the bushing comprises a body formed at least in part from dielectric material and a metal washer sized to be received between the bushing and the antenna arm pivot end, the washer presenting a wear resistant surface against which the antenna arm pivot end mates in engagement.

15. The antenna of claim 11 wherein the fastener comprises a conductive bolt and a conductive bushing, the antenna further comprising a steel spring washer interposed between the fastener and the antenna arm, the washer operative to positively seat the antenna arm and the fastener in conductive engagement.

16. An antenna for a case of a notebook computer, comprising:

a conductive support member having an aperture and configured to be supported on a case;

a conductive antenna arm having a pivotable end configured to rotatably carry the antenna arm on the case;

an insulative bushing received in the support member aperture between the antenna arm pivotable end and the support member; and a conductive fastener configured to retain the antenna arm and bushing to the case and support the antenna arm in electrically conductive relation with an interior of the case, but in electrically insulated relation with the conductive support member.

17. The antenna of claim 16 further comprising a conductive bushing received between the antenna arm pivot end and the conductive fastener and operative to signal couple together the antenna arm, the bushing and the fastener.

18. The antenna of claim 16 wherein the antenna arm comprises an elongate conductive member carried in pivotal and electrically conductive relation with the conductive fastener, and insulated from the conductive support member.

19. The antenna of claim 18 further comprising an electrical connector signal coupled via a first conductor with the fastener, supported within the case and electrically insulated from the conductive support member, the conductive support member signal coupled with a second conductor of the electrical connector.

* * * * *

UNITED STATES PATENT AND TRADEMARK OFFICE
CERTIFICATE OF CORRECTION

PATENT NO. : 5,828,341

DATED : October 27, 1998

INVENTOR(S) : Jeff Delamater

It is certified that error appears in the above-identified patent and that said Letters Patent is hereby corrected as shown below:

Col. 3, line 55, delete "there through" and insert --therethrough--.

Col. 4, lines 16-17, delete "computer 10" and insert --computer 20--.

Col. 5, line 50, delete "purposed" and insert --purposes--.

Col. 6, line 42, delete "engaging" and insert --engage--.

Col. 8, line 35, delete "it's" and insert --its--.

Col. 9, line 60, delete "connector 115 is provided" and insert --connector 108 is provided--.

Col. 9, lines 60-61, delete "circumferential outer connector 108." and insert --circumferential outer conductor 115.--.

Col. 10, line 14, after "biasing of", insert --the--.

Col. 10, line 33, before "within", delete "along".

UNITED STATES PATENT AND TRADEMARK OFFICE
CERTIFICATE OF CORRECTION

PATENT NO. : 5,828,341

DATED : October 27, 1998

INVENTOR(S) : Jeff Delamater

It is certified that error appears in the above-identified patent and that said Letters Patent is hereby corrected as shown below:

Col. 10, line 48, delete "66 with" and insert --66 within--.

Col. 11, line 12, after "pad 66", insert --is--.

Col. 11, line 21, delete "boards 114" and insert --boards 116--.

Col. 11, line 38, delete "section" and insert --sectional--.

Col. 11, line 40, delete "there between" and insert --therebetween--.

Col. 11, line 65, delete "there between" and insert --therebetween--.

Signed and Sealed this

Sixth Day of April, 1999

*Attest:*

Q. TODD DICKINSON

*Attesting Officer*　　　*Acting Commissioner of Patents and Trademarks*